United States Patent [19]

Lundegard et al.

[11] Patent Number: 5,445,474
[45] Date of Patent: Aug. 29, 1995

[54] PULSING REMEDIATION METHOD

[75] Inventors: Paul D. Lundegard, Fullerton; Carl E. Flint; Brent F. Chaffee, both of Yorba Linda, all of Calif.

[73] Assignee: Union Oil Company of California, Los Angeles, Calif.

[21] Appl. No.: 189,152

[22] Filed: Jan. 27, 1994

[51] Int. Cl.$^6$ ............................ B09B 3/00; F02D 3/00
[52] U.S. Cl. ...................................... 405/128; 405/258; 405/563
[58] Field of Search .................... 405/128, 129, 258; 166/248, 267; 175/206, 66; 588/249, 209, 213, 216, 220, 228, 234, 240, 245

[56] References Cited

U.S. PATENT DOCUMENTS

| | | | |
|---|---|---|---|
| 5,076,727 | 12/1991 | Johnson et al. | 405/128 |
| 5,178,491 | 1/1993 | Graves et al. | 405/128 |
| 5,228,804 | 7/1993 | Balch | 405/128 |
| 5,271,693 | 12/1993 | Johnson et al. | 405/128 |
| 5,286,141 | 2/1994 | Vigneri | 405/128 |
| 5,288,169 | 2/1994 | Neeper | 405/128 |

OTHER PUBLICATIONS

In Situ Remediation of VOC Contaminated Soil and Groundwater by Vapor Extraction and Groundwater Aeration, Haztech '88 International, Third Annual Exhibition & Conference, by H. Gudemann and D. Hiller, Sep. 20–22, 1988, pp. 2A–90—2A–111.
EPA/600/R-92/173, "A Technology Assessment of Soil Vapor Extraction and Air Sparging", by Mary E. Loden, pp. 1–63.
"Numberical Simulation of Air Sparging Performance", by Paul D. Lundegard and Greg Andersen, presented to the NGWA/API Conference in Houston, Texas, on Dec. 11, 1993.
"Multi–Purpose Simulation," by Vinsome and Shook published in the Journal of Petroleum Science and Engineering, 1993, v. 9, pp. 29–38.
"The Application of In Situ Air Sparging as an Innovative Soils and Ground Water Remediation Technology", by Michael C. Marley, David J. Hazebrouck, and Matthew T. Walsh, Spring 1992 Ground Water Monitoring Review (GWMR), pp. 137–145.
Focus, "An Overview of In Situ Air Sparging," by R. L. Johnson, P. C. Johnson, D. B. McWhorter, R. E. Hinchee, and I. Goodman, Fall 1993, GWMR, pp. 127–135.
Treatment Technology, "Air Sparging: Savior of Ground Water Remediations or just Blowing Bubbles in the Bath Tub?", by Evan K. Nyer and Suthan S. Suthersan, Fall 1993 GWMR, pp. 87–91.
"Air Sparging: A New Model for Remediation", by Richard A. Brown, Ph.D., and Frank Jasiulewicz, PG, Pollution Engineering, Jul. 1, 1992, pp. 52–55.
Air Sparging: An Optimal Solution, by Wendy C. Leonard, C.P.G. and Richard A. Brown, Ph.D., Proceedings of the 1992 Petroleum Hydrocarbons and Organic Chemicals in Ground Water: Prevention, Detection, and Restoration, Nov. 4–6, 1992, Houston, Texas, pp. 349–363.

Primary Examiner—Dennis L. Taylor
Attorney, Agent, or Firm—William O. Jacobson; Gregory F. Wirzbicki

[57] ABSTRACT

A process for cyclically operating injection and withdrawal wells penetrating contaminated zones. A high flowrate portion of the cycle time preferably does not exceed a transient response period for in-situ formation fluids to achieve a quasi-steady state conditions. A low flowrate portion of the cycle time limits fluid flowrate which allows in-situ formation fluids to at least partially return to the zone affected by the high flowrate portion of the cycle. The cyclic operation produces improved remediation when compared to continuous operation of wells at similar operating conditions.

27 Claims, 3 Drawing Sheets

PULSING REMEDIATION METHOD

FIELD OF THE INVENTION

This invention relates to devices and processes which remediate adverse environmental conditions. More specifically, the invention improves the operating performance of injection or recovery wells which remediate unwanted underground fluids, unwanted dissolved constituents in ground water, and/or contaminated soils.

BACKGROUND OF THE INVENTION

Many toxic or environmentally unacceptable accumulations in underground locations are treated, removed, or otherwise remediated using underground conduits or wells. The wells are used to either inject materials, such as oxygen in a bioremediation process, or withdraw unwanted or contaminated materials, such as gasoline which has leaked from an underground tank.

Operating injection and withdrawal wells consumes energy, typically in the form of electricity to drive fluid pumps. If remediation requires long term operation, large amounts of energy are required, especially when a significant vacuum or pressure differential, e.g., more than 0.5 atmosphere, is required for remediating a large underground aquifer.

Injection wells typically provide a fluid path to a relatively shallow aquifer (when compared to other wells), e.g., the top of a contaminated groundwater aquifer being less than 20 feet (6.096 meters) below a "vadose" zone. If air is injected into the contaminated groundwater, air pressure must be increased above the aquifer pressure, e.g., injection pressure must be raised above the hydrostatic pressure of the ground water. The injected air tends to affect a zone of influence around the well and migrate upward because of water-air density differences.

Injection of air into a saturated zone of an aquifer (air sparging) with the intent of stripping dissolved volatile contaminants has become a commonly advocated alternative to conventional pump and treat systems (e.g., Brown and Jasiulewicz, 1992; Marley et al., 1992; and Leonard and Brown, 1993). Field tests have demonstrated that air sparging can, under the proper conditions, enhance the recovery of some contaminants through a combination of effects, including contaminant partitioning into the vapor phase and acceleration of bacterial degradation of contaminants by increasing dissolved oxygen concentrations. The primary advantages offered by air sparging are that surface water treatment equipment and water disposal may be eliminated, and that the remediation of sorbed contaminants is hopefully accelerated.

To most effectively implement air sparging, it is necessary to predict the pattern of air flow that will occur in the subsurface formation in order to determine the optimal placement and number of sparge wells and their operating conditions. It is desirable to operate sparge wells in such a way as to maximize the spatial extent of air flow regardless of whether volatilization or enhanced biodegradation is the primary remedial process. Withdrawal wells may withdraw liquid (e.g., spilled diesel fluid) or gases (e.g., hydrocarbon vapors). A downhole pump or vacuum is typically required to withdraw these fluids. Several wells (each drawing from a zone of influence around each well) may be required to remove the unwanted fluid to the surface.

SUMMARY OF THE INVENTION

A non-uniform operating process for remedial fluid wells has been found to improve remediation performance of individual injection and withdrawal wells at a site, decrease the operating costs of individual wells, and reduce the number of remediation wells required. Pulsing the site by multiple substantial changes in the remedial fluid flowrate in at least one well during the remediation period prevents the disadvantages of continuous steady state operation. A typical application would impose at least 4 cycles of a high and lower flowrate cycle during the remediation period.

BRIEF DESCRIPTION OF THE DRAWINGS

In these Figures, it is to be understood that like reference numerals refer to like elements or features.

DETAILED DESCRIPTION OF THE DRAWINGS

In order to understand the non-uniform operating process and benefits of non-uniform operation of remediation wells, one must first understand the consequences of transient and continuous operation of remediation wells on the near-well underground formation. A simulation of an air sparging remediation application will be used to illustrate transient and steady state operation, and the consequences of continuous and non-uniform operations over the remediation period. Most of the generalizations also apply to fluid withdrawal wells operated to remediate a site.

Figure 1A:
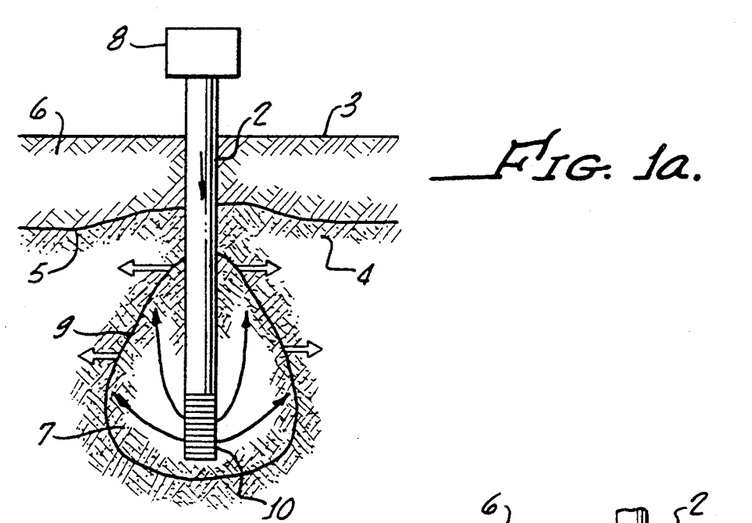
FIG. 1a, and 1b, and 1c show a cross-sectional representation of simulated near-well transient and steady state responses of the formation to injection fluids.
Figure 1B:
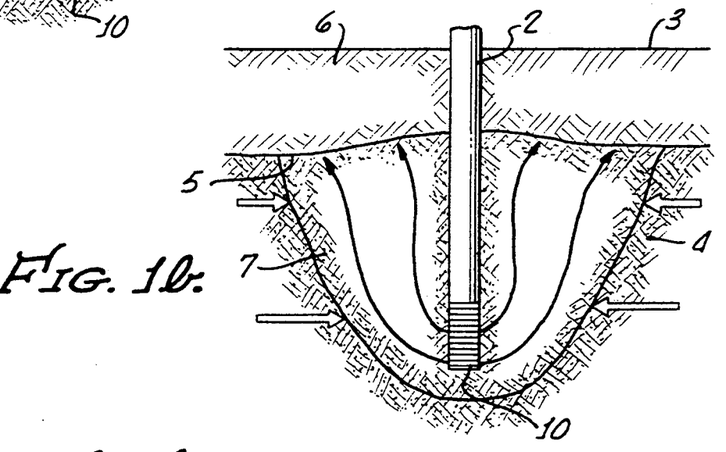

Prior to steady state conditions (shown in FIG. 1c) being achieved in a near-well formation zone after air injection is begun, two distinct transient phases or conditions of fluid flow in the formation were consistently recognized in the simulated transient patterns, an expansion phase and a collapse phase as shown on FIGS. 1a and 1b. During the expansion phase shown in FIG. 1a, the injected air moves primarily radially outward from the discharge of the injection well, e.g., essentially forming a spherically expanding shape. A secondary influence on flow patterns during this period is that the injected air also moves upward in response to buoyant forces in the ground water table. Near the end of the expansion phase, "mounding" of the water table (i.e., a rise in the water level in the vicinity of the well) may occur, modifying the shape of the region of injected air influence to a teardrop or inverted bell-shaped geometry.

The expansion phase ends and the collapse phase (shown in FIG. 1b) begins once significant air emerges or breaks into the vadose zone above the water table. Once air breaks into the vadose zone, the injected air zone within the water table begins to change in shape and dimensions as a higher permeability path for injected air to the vadose zone is formed through the water table. The path (or paths) can be considered a short circuit ending the previous expansion phase. The higher permeability path leads to a collapse phase of a shrinking zone/region of injected air influence in the vicinity of the well.

Figure 1C:
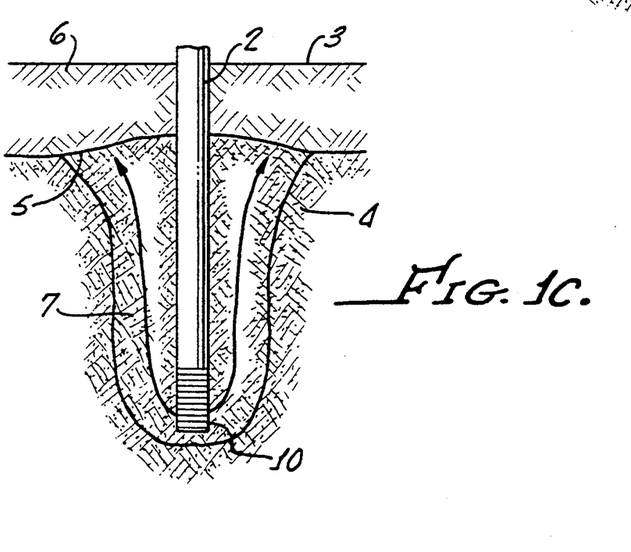

The zonal shrinking and shape changing of the collapse phase continue until steady state flow conditions occur. The depth and width of the zone of influence near the well shrink until the air flow no longer significantly changes the permeability to air in the formation and the air flow distribution pattern stabilizes. Thus, the average zone of influence during the transient flow period (shown in FIGS. 1a and 1b) can be greater than during steady state flow operating conditions as shown in FIG. 1c.

If air injection ceases (during a quiescent period after an initial operating period), static pressure differences between the injected air and water will tend to shrink, buoy up, or migrate the zone of air influence within the formation. If the quiescent period is long enough, the zone of influence can be nearly dissipated and another period of air injection will produce similar expansion, collapse, and steady state operating phases.

The (non-uniform process) operating time limits the period of time during which significant air is injected are a function of the transient period, followed by a quiescent or recovery operating period. This recovery period allows ground water to return to the air influenced zone before significant amounts of air are again injected, e.g., by cyclic operation of an air compressor on a sparging well. By avoiding long continuous operating periods (when compared to the duration of the transient period), the non-uniform operating process allows a larger average air zone of influence to be achieved.

Pulsed operating periods can be longer or shorter than the transient response period of the subsurface formation to significant air injection. Preferably, pulse, operation ceases (or flowrates are significantly reduced) prior to the collapse phase. Since the in-situ fluid permeability of the near-well formation typically declines as in-situ fluids are (withdrawn or) displaced by injected fluids, a quiescent period prior to collapse phase (and nearly total displacement of in-situ fluids within a channel) allows in-situ fluids to more easily return to the near-well formation zone. The return of in-situ fluids permits the next pulsed operational period to avoid air channeling to the vadose zone. Other advantages of non-uniform or pulsing operation over uniform operation of a sparging well can include: reduced compressor energy consumption, improved partitioning of contaminants, reduced risk of "bio-fouling," and avoidance of excessive drying out of remediating bacteria.

Although cyclic permeability changes explain some of the advantages achieved by non-uniform operation, other reasons for improved performance are not altogether clear. For example, limited cycling of a sparging air injection well can theoretically reduce channeling losses of injected air and avoid excessively drying a channel in the bioremediation zone when compared to continuous air injection. Non-uniform operation may also prevent traps or pockets of oxygen-depleted air which may hamper bioremediation in the pockets.

The present invention is more tolerant of off-design conditions, such as unexpected underground faults. In a contaminated fluid withdrawal application, air or a more viscous fluid can be non-uniformly injected into unexpected fault channels during a quiescent withdrawal period to minimize unwanted withdrawals of nearby groundwater through the unexpected fault. Schedules of intermittent well operation (e.g., on-off periods), cyclic operating periods or pulsing times can also be changed as fluid formation pressures (or other parameters) change over time, lengthening the useful life of the remediation well. Changing pulsing times to increase or decrease the size of the zone of influence can also accommodate migration of contaminated groundwater.

Pulsing times are also a function of the average of instantaneous operating fluid flowrates during the "on" period. The fluid flows through a well at a first average (well) flowrate causes a portion of in-situ fluids within a formation zone near the well to be displaced during a transient period. For typical average flowrates, the duration of the first "on" period is no longer than about 10 times the transient period of time and is preferably less than the transient time period, most preferably less than the expansion phase portion of the transient time period.

After the first period, the average flowrate in the well is substantially reduced or eliminated for a quiescent or second period of time, causing at least a partial replacement of displaced in-situ fluids or entry of other fluids into the zone. Depending upon how much replacement or entry of fluids is desired (and how quickly the fluids move), the duration of the second or quiescent period of time can be similarly no longer than several months, but may also be longer or shorter than the first period. After the quiescent period, the average well flowrate is then substantially increased, again displacing near-well-located fluids for a third period of time which may be similar to the first period.

Remediation wells are operated at a first nominal flowrate for a first period followed by a quiescent period. Subsequent changes in flowrate over the duration of the remediation operating period occur until the remediation process is nearly complete.

The duration of the first period is typically a function of the transient flow conditions within the formation prior to steady state conditions. By limiting the duration of the first period, conditions within the formation are allowed to easily recover during the quiescent period prior to subsequent operation. These durations and other operating conditions can be estimated based on experience, but a simulation is the preferred method for estimating durations and operating conditions.

Two dominant fluid phases with the formation were included in these simulations, water and air. Because of the large heat capacity of the formation, isothermal compressibility of both phases were also assumed.

For these simulations, a radially symmetric, homogeneous, anisotropic grid with a single vertical air injection well at the center was selected. Grid sizes were selected to allow good resolution (0.33 feet radius grid size) in radial vicinity of the sparge well and the water table while larger grid sizes further away from the well were selected to save computation time. The vertical grid spacing was varied from 0.5 to 2.0 feet. A sensitivity study confirmed that the results were not significantly sensitive to different grid sizes and spacings.

Simulations focused on how transient and steady state air flow patterns were affected by the following input variables: injection pressure and flowrate, injection depth, absolute permeability of the aquifer, and anisotropy of the aquifer. Although the simulations showed that transient behavior can vary drastically as these variables are changed, e.g., the transient behavior may last from hours to years, consistent patterns of transient behavior emerged.

FIGS. 1a, 1b, and 1c show the consistent patterns of multi-phase flow simulations of air flow. FIG. 1a illustrates injected air flow patterns (shown by flow arrows) emanating from an operating sparge well 2 which extends from a ground surface 3 to a contaminated aquifer 4. A top boundary 5 of aquifer 4 is also the lower boundary of a vadose zone 6.

An expanding zone of air influence 7, as shown by open arrows, results from the air injection flow in the well 2. The zone of air influence typically contains air and groundwater, with the air content increasing as more air is injected and flows into to zone.

The simulations show that there are three phases of behavior following initiation of air injection. These three phases of behavior are: 1) an initial transient period of growth in the lateral and vertical limits of air flow (i.e., an expansion phase shown in FIG. 1a), 2) a second transient period of reduction in the lateral limits of air flow (i.e., a collapse phase shown in FIG. 1b), and 3) a steady state phase shown in FIG. 1c, during which the system remains static as long as injection parameters do not change.

The first transient or expansion phase (shown in FIG. 1a) is dominated by the initial properties of the near-well formation. The permeabilities and flowrates of a "new" fluid such as air being introduced (i.e., a fluid being injected into a formation or distant in-situ fluids displacing near-well withdrawn fluids) is a function of the initial formation properties, some of which are in turn affected by the presence of the in-situ fluids. A relatively large zone of influence 7, i.e., the space penetrated or affected by the new fluid, can be achieved during this expansion phase. A means 8 for applying relatively high pressure on the injected fluid (when compared to aquifer pressure), such as a pump, is typically applied during the expansion phase period, causing a generally radially outward (or inward, alternatively) flow pattern.

During later portions of the expansion phase, the size and geometry of the region of air flow changes as injected air approaches the water table. Mounding of the water table is commonly associated with this phase of behavior just before the end of the expansion phase ends as the boundary 9 of the air zone of influence 7 approaches the vadose zone 6.

The expansion phase is followed be a second transient or collapse phase (shown in FIG. 1b) which is dominated by an air (or other "new" fluid) path within a shrinking zone of influence 7 (as shown by open arrows) from the well screen 10 or other port in well 2 open to the formation, such as the top of the water table 5 or other formation boundary. Formation properties and flow patterns (as shown by flow arrows) in the path, such as injected air permeability, are affected by the increasing presence of air displacing in-situ fluids. As the injected air displaces more in-situ fluids in the path, the relative permeability to air in the path increases and injected air flow is increasingly "short circuited" to the vadose zone. The zone 7 continues to displace water and radially contract until steady state conditions are reached.

Steady state conditions are shown in FIG. 1c. A major portion of the in-situ water has been displaced from the zone of air influence 7 so that injected air has little resistance to flowing upward to the vadose zone 6 within the stable influence zone geometry, but meets significantly greater resistance to any flow outside the zone of influence.

Thus, an initial period of transient (expansion and collapse phase) air injection operation typically affects a larger zone of influence than later injected air during similar steady state (i.e, continuous operation) conditions. By reducing injected flow (e.g., ceasing injection before steady state conditions occur) before resuming air injection operations, i.e., non-uniform operation, in-situ water can return to the air influence zone between operating periods. Non-uniform operation avoids a major disadvantage of continuous operation, i.e, an unwanted diversion of air flow such that a smaller aquifer region is influenced by the injected air flow.

Still other disadvantages of continuous air injection are avoided. Continuous air injection may lead to drying out of the air flow pathways. This can occur by displacement of pore water until residual water saturation is reached, followed by evaporation of the residual water into the air stream. Drying may reduce the activity of in situ water-borne bacteria, thereby reducing the rate of biodegradation and remediation.

As more water is evaporated, contact of the injected air with contaminated water may also become more limited. Once stable pathways of air flow are established, the contact area between contaminated ground water and air shrinks, reducing diffusion of volatiles into the air pathways or diffusion of oxygen from the air into the ground water.

In addition, contaminant partitioning between the dissolved or absorbed phase and injected air may be a limiting step in steady state remediation operations. Initially high concentrations of volatile contaminants may partition into the injected air, but these concentrations may decrease with time resulting in less efficient remediation.

Additional power consumption (and a larger number of compressors, e.g., as spares) may also be required for steady state remediation when compared to non-uniform processes. For example, more compressed air may be required as partitioning efficiency declines. Moreover, undesirable (aerobic bacterial) "bio-fouling" of a well screen or aquifer exposed to continuous air injection may occur, further increasing power consumption.

In contrast, a quiescent period (such as an intermittent shut-down of air injection) prior to limited operating periods of times affects a larger zone, thereby reducing power consumption. The quiescent periods allow a new mass of contaminated ground water (outside the zone) to enter the zone and recharge the (water) depleted region of air flow influence. Each remediation well operated in a non-uniform process therefore remediates a larger total volume of ground water. Moisture content in the formation will also be kept high even along what would be the "short circuit" air flow paths to the vadose zone, allowing remediating bacteria to continue to thrive instead of being dried out. This intermittent flow procedure will increase remedial effectiveness whether the quiescent period begins before or after steady state is achieved, but a quiescent period prior to achieving steady state flow patterns is preferred.

By shutting the air injection system off for a period of time sufficient to allow significant recharge to nearly initial conditions, it is possible to long term cycle the well, maintaining a much larger volume of aquifer cyclicly influenced by the injected air. If contaminant concentrations in the effluent air (entering the vadose zone) decrease because of decreasing rates of desorption or diffusion after long term cycling, air injection flowrates or operating times can changed to increase the contaminant mass recovered per unit of injected air.

Intermittent operation may also reduce the number of compressors required for reliable operation of several injection wells.

Optimum scheduling of air compressor performance (e.g. on-off times) greatly depend on the geologic properties of the medium. Permeabilities of geologic materials, which determine flowrates at a given pressure, vary over ten orders of magnitude. Further, the magnitude of permeability tends to vary with direction, with permeabilities along geologic layers being greater than permeabilities across geologic layers. The directional variation is called anisotropy. It is the absolute value of permeability of each geologic layer, its anisotropy, and the geometrical arrangement of formation portions or layers of differing permeability that determines the directions and time scales of air flow around air sparging wells. Other important operating process factors include the depth of air injection, injection pressure, and maintaining ground water saturation levels above a lower threshold level during the process, especially at locations within the water table near the vadose-zone. Because of the variation in these factors, the optimum intermittent flowrate schedule will vary from site to site.

The time required for a particular system to progress through the transient phases and establish steady state behavior can vary from hours to years, and is dependent on the permeability structure of the aquifer, injection depth, and injection flowrate. If air injection is stopped anytime during the transient progression of behavioral phases, ground water will begin to re-saturate the pores where it was displaced by injected air. This process of re-saturation, especially complete re-saturation, will generally take longer than the initial displacement of water because of saturation hysteresis.

It may not be necessary to shut the air compressor off completely during the "off" or recovery period in order to achieve optimum benefits of intermittent or non-uniform operation. Although it may be preferable that the flowrate during the quiescent periods be essentially zero, an average flowrate of about ten percent of the "normal" or "on" period flowrate may also be acceptable during the quiescent periods, possibly as much as 20 percent of average "on" period flowrates. For delivering dissolved oxygen, the most preferred schedule may be one that reduces, but does not eliminate the flowrate of oxygen, especially when the quiescent period begins near the end of the transient expansion phase and the extent of the region of air influence is greatest.

The time periods can be controlled manually or automatically. Once the transient or expansion phase period is known or estimated, non-uniform operation might be achieved "automatically," e.g., through the use of timers installed on the air compressors. "Automatic" operation may also be achieved through feedback apparatus such as moisture sensors, dissolved oxygen sensors, or volatile organic carbon sensors. Data processing could also be used to control operating times, pressures, and other variables based upon a plurality of sensors and/or timers. Alternatively, manual adjustment of flowrates can be made at regular or irregular intervals.

During a quiescent period, previously injected air may be vented, e.g., the average flowrate reversed in direction and an injection well would be periodically also used as a withdrawal well. Venting or withdrawal of the injected air would accelerate replacement of air by ground water.

After the "quiescent" (or second) period of reduced or negative injection air flowrate, the injection air flowrate is resumed or significantly increased during a third period, e.g., to approximately the same flowrate as the initial injection air flowrate. The zone of air influence, especially the width and depth of the zone, during the third period expands and can again be controlled by limiting the duration of the third period in order to achieve a larger average zone of influence, e.g., a zone larger than the steady state phase of air injection at the same first flowrate.

To determine or confirm optimum cycling periods and flowrates during each "on" and "quiescent" period, simulation and pilot testing may be accomplished to estimate these times. Optimizing remediation performance will also depend upon the type of remediation process and what fluid-like materials are being injected or withdrawn. For example, enhanced bioremediation may require the controlled cyclic deliveries of microorganisms, nutrients, dissolved or gaseous oxygen (in air), and moisture. Simulation and/or testing of remediation processes using these several materials may be required to optimize performance. Less complex simulation and/or testing may be required if cyclic withdrawal (stripping) of vadose zone gases or dissolved volatile organic compounds in contaminated groundwater is to be accomplished. Data from short term pilot testing can quickly confirm the transient results of a simulation, avoiding long term pilot testing which might otherwise be needed.

Figure 2:
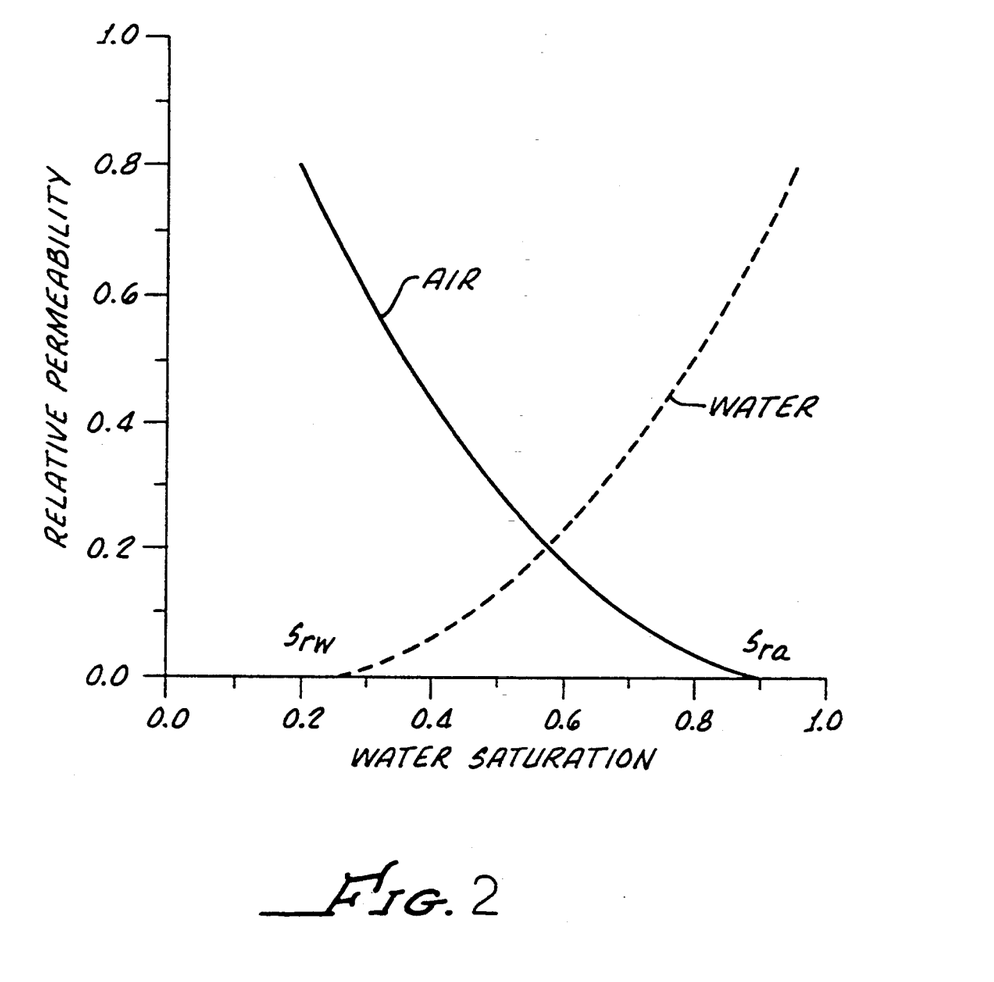
FIG. 2 shows a graph of air-water relative permeabilities.

FIG. 2 shows a sample graph of relative (and dimensionless) permeabilities of air and water in an underground formation. The dependence of relative permeability on fluid saturation is non-linear and the two relative permeabilities shown do not necessarily sum to 1.0. The graph in FIG. 2 illustrates the fact that fluid permeability of an underground formation is typically fluid specific. For example, as a first fluid present in a formation is displaced by another fluid, the permeability of the formation to the first fluid decreases.

Thus, injection of a fluid different from the in-situ (e.g., saturated) fluid causes transient permeability changes until a steady state, two-phase flow distribution is achieved. Another way of expressing this relationship is that the relative permeability to each fluid depends on the volumetric fraction of the pore space that it fills when the two fluids, such as air and water, are present in the pores of a material.

Generally, there is a minimum saturation that must be exceeded before a fluid, especially a wetting fluid such as water, becomes mobile (i.e., when relative permeability to fluid i, $k_{ri}$, is greater than 0). This minimum saturation is known as the residual saturation for that fluid. In the example shown in FIG. 2, significant air/water permeability does not occur until residual water saturation ($S_{rw}$) is at least about 0.20 and residual air saturation ($S_{ra}$) is at least about 0.05. It is common for the residual saturation of a wetting fluid (normally water based in relatively shallow underground formations) to significantly exceed the residual saturation of the non-wetting fluid (air in the case of air sparging).

Two-phase fluid flow distribution within a formation depends upon dimensionless permeabilities and can be expressed as follows:

$$q = (k k_{ri}/\mu_i)(\Delta h/\Delta l)$$

where q is the volumetric flowrate per unit area, k is the intrinsic permeability, $k_{ri}$ is the relative permeability to fluid i, $\mu_i$ is the viscosity of fluid i, and ($\Delta h/\Delta i$) is the head or pressure gradient of fluid i. Thus, even when the average well flowrate during the transient period is constant, significant transient changes in relative permeability (as the in-situ fluid is displaced) during a transient period can cause significant changes in transient flow distribution within the near-well formation. The transient flow distribution can be quite different from the comparable steady state flow distribution.

The implications of multi-phase flow theory for a remediative air sparging application is that the permeability to air in a typical underground zone saturated with contaminated ground water will initially be nearly zero, then be low as air penetrates, and then increase significantly as injected air displaces most of the ground water. The initially high resistance air flow typically requires a relatively high pressure gradient to generate a flow pattern which slowly expands radially outward around the air injection well. Since buoyancy of the air in water typically acts at a lower pressure gradient, buoyancy has comparatively little effect during the initial transient period. As air saturation increases, air mobility increases as the relative permeability increases. With increasing air mobility, buoyant forces will tend to have an increasing relative effect, causing the injected air to rise.

Figure 3:
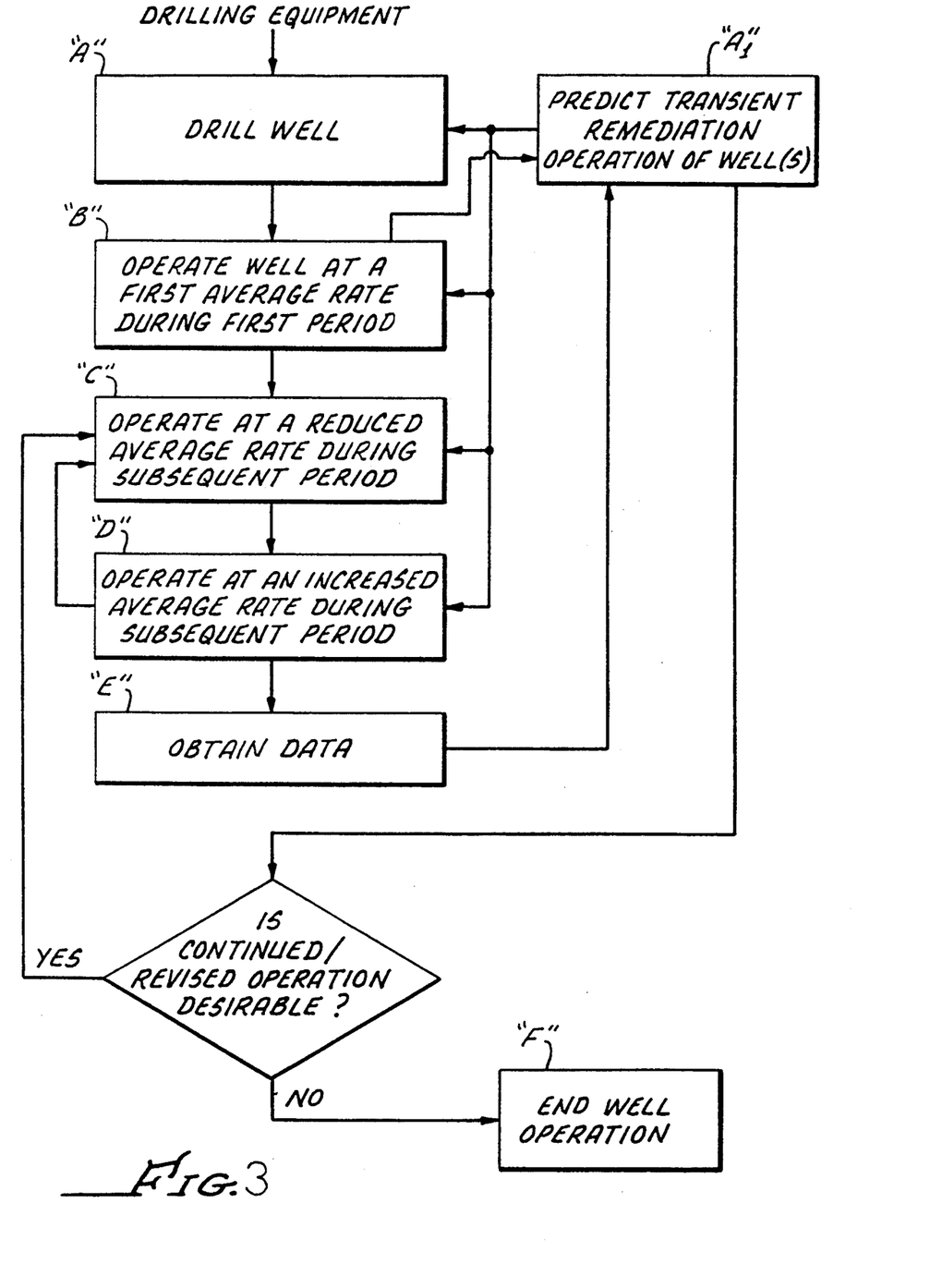
FIG. 3 shows a process flow diagram of an embodiment of the invention.

A process flow diagram of an embodiment of the process is shown in FIG. 3. One or more wells or conduits into or near a contaminated region are drilled or excavated at Step "A." The wells or conduits may be substantially vertical, horizontal, or deviated from either the horizontal or vertical direction. The wells or conduits can be operated to provide a fluid path from a surface location to an intake or discharge zone within or near the contaminated region.

The operating remediative performance of the drilled well or excavated similar well is simulated or predicted at step "$A_1$." Simulation may be performed before, concurrently with, or after step "A." Simulation may be accomplished using the finite difference model previously discussed, but alternate means of predicting well performance may also be used, such as experience with similar site conditions, pilot testing, or analog simulation methods. Prediction of transient and/or cycling performance is the objective of the simulation so that operational cycling variables can be selected to take advantage of beneficial transient conditions and achieve optimum performance. Operational variables include well fluid flowrates and cycling or pulsing periods.

The well is operated at Step "B" by flowing fluid through it, e.g., injecting a fluid at a first average fluid flowrate. An injected remedial fluid typically has significantly different properties from the in-situ fluid in the formation, e.g., injecting air into contaminated groundwater, but an injected fluid may be a mixture which includes fluids having physical properties similar to the in-situ fluid. The operational variables during air injection can be set at the predicted (e.g., optimum) values and the well operated during a first (predicted) period. By limiting the period of operation, a transient (and larger than steady state) expansion phase zone of influence can be obtained. Alternatively, the system may be operated until after steady state is achieved, typically for a time period no more than 10 multiples of the transient period, more typically less than twice the transient period, in order to take repeated advantage of beneficial transient conditions. Injection or withdrawal of fluids during these periods may be at a relatively constant or an increasing flowrate, i.e., the instantaneous fluid flowrate in the well is not necessarily the same as the average well fluid flowrate during an operating period. Operation over the first period tends to displace in-situ fluids within the underground zone influenced by well operation while a following quiescent period tends to allow in-situ fluids to return to the zone.

Alternatively, initial operation of the well (e.g., at step "B") acts as a test period. Transient or pulsing test data is obtained (e.g., at step "E") and used to optimize later remedial operating performance. Subsequent to the test period, the first remedial operation may be at average flowrates which are the same, greater, or less than test period flowrates.

After the first period of remedial operation, a second or subsequent period of (withdrawal or injection) operation at a reduced fluid flowrate is accomplished at step "C." The reduced flowrate (in the operational direction) may also be a fluid not necessarily the same fluid as in step "B." The reduced flowrate may be in the opposite direction, a cessation of flowrate in either direction, or a continuation of fluid flow in the same direction as step "B" but at a significantly decreased flowrate.

The second or subsequent time period and reduced flowrate values are also typically based on the predicted transient or cycling performance of step "$A_1$." The reduced flowrate allows in-situ (or other) fluids to at least partially flow into and/or return to regions where in-situ fluids were displaced by the larger flowrates of step "B." Determining how much to reduce the flowrate and for how long can also be based on test data with or without numerical simulation.

After in-situ or other fluids return or flow into the zone of influence resulting from the reduced or reversed flow at step "C", the average flowrate can be increased or returned to the original direction during step "D." The increased average well flowrate may be the same as, less than, or greater than the first average well flowrate of step "B," but is typically similar to the first average flowrate. By repeating steps "C" and "D, a cycling or repetitive pulsing performance can be achieved that better remediates (e.g., treats a larger portion of) a contaminated zone than the same well operating continuously at a comparable first flowrate.

Step "E" and repeating step "$A_1$" to obtain data for a subsequent simulation of remedial well performance) are optional. These optional steps are especially useful when remediation processes alter groundwater flow and/or when migration of underground fluids occurs. Subsequent simulation allows revised operational variables to be calculated which would continue to optimize remedial performance under later (different) conditions. Simulation may also show that ceasing operation of one well and/or beginning operation of another well will optimize remedial performance.

If continued cycling operation of a well is no longer desirable at the cycling rates (e.g., as indicated by the simulation step "$A_1$"), operation of that well can be ended at Step "F." Other withdrawal and/or injection wells may continue to operate at this point in the process. If revised operation of the well is indicated, modified cycling or pulsing performance can be accomplished by returning to step "C."

Besides improved remediation efficiency, safety may be another advantage of non-uniform operating process. Cyclic quiescent periods tending to return in-situ fluids minimize the risk of inadvertently discharging toxic or other undesirable fluids to the atmosphere or drinking water aquifers. Associated simulations are also expected to be improve safety and reliability of the remediation process.

Although the total cycle time and the times of each cycling period are theoretically unlimited and depend upon factors such as formation and well operating variables, total cycle (one "on" period plus one "off" period) times typically range from about 0.5 hours to three months (2160 hours), more typically ranging from about one hour to about one month (720 hours), still more typically ranging from about two hours to one week (168 hours). The higher flowrate or "on" portion of the cycle time is typically within the range from about 0.5 hours to one month (720 hours), preferably from about one hour to three days (72 hours), still more preferably from about two hours to two days (48 hours). The lower flowrate "off" or quiescent period portion of the; cycle is also typically within the range from about 0.5 hours to one month (720 hours), more typically one hour to three days (72 hours), but the quiescent period may be significantly longer than the higher flowrate period.

Similarly, average cyclic flowrates are theoretically unlimited, but the higher flowrate during an "on" portion of an air injection cycle is generally within the range from about 0.25 to 100 standard cubic feet per minute or scfm (0.118 to 47.2 liters/sec) for a typical one foot (0.3048 meter) well section, preferably at least about 5 scfm ( 2.36 liters/sec) and less than about 50 scfm (23.6 liter/sec). For a two foot (0.696 meter) well section, such as a screen, penetrating and discharging air into a formation, the higher flowrate portion would typically range from 0.5 to 200 scfm (0.236 to 94.4 liters/sec). The lower fluid flowrate during the quiescent portion of the cycle is typically within the range of from about 0 to 10 scfm (0 to 4.73 liters/sec), preferably less than about 5 scfm (2.36 liters/sec), but also may be a withdrawal rate within the range of about 0.25 to 100 scfm (0.118 to 47.2 liters/sec) for a one foot (0.3048 meter) well section and comparable withdrawal flowrates for other well sections.

EXAMPLE

The invention is further described by example simulations and sensitivity analysis which illustrate a specific mode of practicing the invention and is not intended as limiting the scope of the invention as defined by the appended claims. The examples are derived from simulations of a single vertical well penetrating a contaminated ground water aquifer for sparging.

The steady state and transient flow behavior within a formation that results from the injection of air were simulated with a TETRAD multi-phase, multi-component simulator available from DYAD 88 Software Inc. TETRAD is a finite difference simulator developed to study underground petroleum and geothermal resources. It was modified to accommodate the shallow formation zones and applicable solution methods as generally described in the paper entitled "Multi-Purpose Simulation," by Vinsome and Shook published in the Journal of Petroleum Science and Engineering, 1993, v. 9, p. 29–38 which is incorporated in its entirety herein by reference.

Assumptions for the example simulations and analysis include a generally homogeneous aquifer having a porosity of 30 percent, but having anisotropic horizontal and vertical permeability. Simulations varied horizontal permeability varied from 0.1 darcy ($\approx 10^{-4}$ cm/s) to 10 darcys ($\approx 10^{-2}$ cm/s), and a ratio of horizontal to vertical permeability was varied from 1:1 to 20:1. A second order analytical equation was used to define the relationship between relative permeability and fluid saturation (as shown in FIG. 2). A nominal 2 inch (5.08 cm) diameter sparge well with a screen length (at injection depth) of 2 feet (0.696 meters) was also assumed. Air injection flowrate was allowed to vary up to a maximum of about 30 scfm (849.5 liters/minute). In order to avoid hydraulically fracturing the formation (normally undesirable in a shallow remediation well), a maximum injection pressure was also limited to 0.7 times the difference between the lithostatic and hydrostatic pressures at the depth of the well screen. For the base case simulation (where the well screen was about 40 feet or 12.192 meters below a water table), the maximum injection pressure limit was 26.3 psig (about 2.79 atmospheres). Injection depth was varied from 10 to 80 feet (3.048 to 24.38 meters) below the upper boundary of the water table level, which was assumed to be below an initially 20 foot (6.096 meter) thick vadose zone.

One variable was allowed to change while others are fixed and a sensitivity analysis of that variable was performed. Results of many simulations and sensitivity analyses showed that transient behavior (i.e., an initial expansion phase followed by a collapse phase) may last from a few hours to several years for a range of formation, well, and operating variable assumptions. Increasing injection flowrates from 5 to 13.6 scfm (141.6 to 385.1 liters/min) while holding other variables fixed increased the steady state width of the region or zone of air influence from about 10 to 20 feet (3.048 to 6.096 meters). The sensitivity of increasing injection depth showed little impact on the width of the zone of influence during steady state conditions, but did affect the width during transient operation. When other variables were fixed (including the ratio of horizontal and vertical permeabilities), changing permeability did not affect the shape of the flow distribution. When the anisotropy of permeability was increased from 1:1 to 10:1, the width of the steady state region of influence increased by more than a factor of three and the maximum width (during the expansion phase) also increased as anisotropy increased.

The sensitivity analyses also showed that injection pressure has a substantial impact on both transient and steady state behavior. Increasing injection pressure widens the zone of influence during both transient and steady state behavior. However, the initial injection pressure was limited because of the shallow nature of typical remediation wells and limited fracture pressures. For example, a high initial injection pressure risks early breakthrough or air to the vadose zone. The preferred process is to approach a target flowrate by gradually increasing injection pressure during each high flowrate portion of the cycle until the target flowrate is reached, e.g., instantaneous flowrates of about 75 percent of the average flowrate at the beginning of the operating period and gradually increasing to about 125 percent of the average flowrate at the end of the period. Even if not gradually increased., the instantaneous flowrate should not abruptly increase or decrease by an amount more than 25 percent of the average flowrate during this period. This is the safest way to avoid soil fracturing.

The width of the transient zone of influence (as nominally measured at or above the well discharge screen as a reference point) can be very different from steady state width. Transient width may be as much as 5 times greater than the steady state width. Further information on the transient analysis technique used for this example and other related information are disclosed in a paper entitled "Numerical Simulation of Air Sparging Performance," by Paul D. Lundegard and Greg Andersen, presented to the NGWA/API Conference in Houston Tex., on Dec. 11, 1993, the teachings of which are incorporated herein in their entirety by reference.

Simulations also indicate that pulsing or non-uniform operation can offer other advantages over steady state operation when remediating groundwater contaminated with dissolved volatile organic compounds (VOC's) using sparging air. Constant, high air flowrate withdrawal typically leads to decreasing concentrations of VOC's in the effluent air due to short-circuiting or partitioning-limited contaminant transfer. Non-uniform operation can mitigate this effect and have the benefit of reduced energy requirements for blowers and off-gas treatment units.

Simulations indicate that as groundwater saturation levels change within the zone of influence, optimum air-groundwater contacting conditions for stripping the VOC's may be achieved and maintained by cycling or pulsing. Temperature of the injected fluid may also be controlled to more quickly strip VOC's, e.g., elevated air temperatures during longer initial air injection (thermal soak) cycles followed by shorter period, reduced temperature air injection cycles. Withdrawal (of VOC stripped vapor) periods can also alternate with these elevated air temperature injection periods.

Similar to the injection simulations described above, withdrawal of contaminated fluids may also benefit from pulsed or non-uniform operation, preferably limited to periods less than a transient period as defined by the time required (after the start of fluid withdrawal from the well) to reach essentially equilibrium or steady state flow patterns in the formation. Formation flows of both the near-well (hydrocarbon) contaminated fluid and the more distal (from the well) uncontaminated groundwater are typically controlled by fluid permeabilities which are in turn dependant upon a saturation of the formation with the contaminated fluid. Once the in-situ contaminated fluids near the well are displaced within a channel (e.g., reduced to significantly below saturation levels), steady state permeability in the channel to contaminated fluids is low and channel permeability to uncontaminated groundwater is high. Steady state channeling of the displacing (groundwater) fluid to the withdrawal well can essentially trap or leave unwanted contaminated fluids in place outside the channel, or at least inordinately increase the time needed to migrate the contaminated fluid outside the channel into the withdrawal well. In contrast, periodic cycling the flowrate and minimizing the "on" period of operation of a withdrawal well (and/or control of other cyclic variables such as pressure) can allow the contaminated fluid to return to the channels after each "on" period of operation. This results in a larger portion of the contaminated fluids to be withdrawn by cyclic operation instead of continuous operation at comparable flowrates.

Still other alternative embodiments are possible. These include: integrated cycling of a plurality of injection and withdrawal wells; extending a well into several contaminated zones and concurrently or alternating non-uniform flow in several zones; providing a second conduit within a well extending into several zones and concurrently alternating withdrawal (at one zone) and injection (at another zone) functions; and providing on-line well/formation instrumentation, computing, data processing, and well control capabilities to achieve real time control and optimization of cyclic parameters.

While the preferred embodiment of the invention has been shown and described, and some alternative embodiments also shown and/or described, changes and modifications may be made thereto without departing from the invention. Accordingly, the invention embraces all such changes, modifications and alternative embodiments as fall within the spirit and scope of the appended claims.

What is claimed is:

1. A process for bioremediating a contaminated zone by pulsing air into an underground formation containing an in-situ fluid, said process comprising:
   drilling and completing a well which penetrates said contaminated zone;
   injecting an air pulse through said well into said contaminated zone at a flowrate of at least about 0.25 SCFM for a first period of time lasting no more than 720 hours at a first average air flowrate;
   substantially reducing said average air flowrate to a second average air flowrate during a second recovery period of time following said first period, said second recovery period lasting from about 1 to 720 hours; and
   injecting another air pulse at a third average air flowrate greater than said second average flowrate into said contaminated zone for a third period of time following said second recovery period, said third period lasting no more than 720 hours.

2. The process of claim 1 wherein said third average air flowrate is substantially the same as said first average air flowrate and said process also comprises the steps of:
   withdrawing fluid from said zone through said well during a withdrawal period of time after said third period; and
   injecting air at a fourth average air flowrate which is substantially the same as said third average air flowrate for a fourth period of time following said withdrawal period, said fourth period lasting no more than 720 hours.

3. The process of claim 2 wherein said first average air flowrate is less than about 100 SCFM.

4. The process of claim 3 which also comprises:
   numerically simulating said process and calculating saturation levels within said underground formation, said numerical simulation allowing calculation of in-situ fluid saturation levels within said underground formation over a calculated period of time; and
   calculating a first calculated period of time which does not allow said calculated saturation levels of said in-situ fluid to be reduced below a lower threshold limit at a reference underground location.

5. The process of claim 4 wherein said first period of time is no more than about said first calculated period of time.

6. The process of claim 5 wherein said numerically simulating step uses a finite difference, grid simulation model of said formation and wherein a minimum dimension of each element of said grid is set to be no greater than one meter.

7. The process of claim 6 wherein the instantaneous flowrate does not substantially decline during said first period.

8. The process of claim 7 wherein the instantaneous flowrate generally rises during said first period.

9. The process of claim 8 wherein said first period of time lasts no more than about 72 hours.

10. A process for flowing a remediating fluid within a contaminated underground zone containing an in-situ fluid, said process comprising:

drilling a well which provides a conduit for fluid flow to and from said underground zone;

flowing said remediating fluid into said underground zone at a first average fluid flowrate for a first period of time which is no greater than 2160 hours, wherein at least some of said in-situ fluid is displaced during said first period of time by said remediating fluid; and substantially reducing said average fluid flowrate to a second average fluid flowrate during a second period of time following said first period, wherein said second period of time is at least 0.5 hours.

11. The process of claim 10 wherein said remediating fluid comprises air and said in-situ fluid is water, and wherein said first and second average flowrates are substantially periodically cycled for at least two cycles and said first period is not equal to said second period.

12. The process of claim 11 wherein said first average flowrate is substantially equal to a mathematical average of instantaneous well flowrates during said first period and said instantaneous well flowrates do not substantially decline during said first period, said process also comprising the steps of:

flowing a fluid through said well at a third average flowrate for a third period of time after said second period of time, wherein said third average flowrate is substantially larger than said second average flowrate and said third period of time is no more than 720 hours; and substantially reducing said average flowrate to a fourth average flowrate after said third period.

13. The process of claim 12 which also comprises:

numerically simulating said process and calculating in-situ fluid saturation levels over time at a reference location; and calculating a first calculated period of time during which a first calculated average flowrate flows into said contaminated zone, wherein said first calculated period does not allow said calculated in-situ fluid saturation level to be reduced to below a lower threshold limit; and calculating a second calculated quiescent period of time after said first calculated period, wherein said second calculated period allows said calculated in-situ fluid saturation levels to rise significantly.

14. The process of claim 13 wherein said first period is no longer than said first calculated period and said second period is at east as long as said second calculated period.

15. The process of claim 14 wherein said first average flowrate is injected into a plurality of underground zones.

16. The process of claim 15 wherein said numerically simulating step also calculates relative permeabilities at a plurality of locations, said relative permeabilities being dependant upon said calculated in-situ fluid saturation levels.

17. A pulsing process for remediating an underground contaminated zone during a remediation period of time which comprises:

flowing a remediating fluid into said underground zone at a first nominal fluid flowrate during a pulse time period which lasts no longer than 720 hours; and significantly changing said nominal flowrate at the end of said pulse time period, wherein at least three pulse time periods occur over said remediation period.

18. The process of claim 17 wherein at least 4 pulse periods occur over said remediation period.

19. The process of claim 18 wherein at least 6 pulse periods occur over said remediation period.

20. The process of claim 19 wherein at least 10 pulse periods occur over said remediation period.

21. A process for treating an in-situ fluid with a remediating fluid using a fluid conduit penetrating an underground contaminated zone having a relative permeability to said in-situ fluids, said process comprising:

calculating a transient period during which a first average flowrate of said remediating fluid displaces a portion of said in-situ fluid within said contaminated zone and reduces said relative permeability at a reference location within said contaminated zone, said transient period lasting until said relative permeability essentially stabilizes;

flowing said remediating fluid at about said first average flowrate during a first period which is no greater than about twice said transient period; and flowing said remediating fluid at a reduced average flowrate during a second period following said first period, wherein said reduced average flowrate allows said relative permeability to increase.

22. An apparatus for treating an in-situ fluid with a remediating fluid within an underground contaminated zone having a relative permeability to said in-situ fluids, said apparatus comprising:

a fluid conduit from a surface location to said underground contaminated zone containing said in-situ fluid;

means for calculating a transient period during which a first average flowrate of said remediating fluid within said contaminated zone displaces a portion of said in-situ fluid and reduces said relative permeability at a reference location within said contaminated zone, said transient period lasting until said relative permeability essentially achieves a steady state condition;

means for flowing said remediating fluid to said underground contaminated zone at about said first average flowrate during a first period;

means for controlling the duration of said first period such that said first period is no more than twice said transient period; and means for flowing said remediating fluid at a reduced average flowrate after said first period, wherein said reduced average flowrate allows said relative permeability to increase.

23. The apparatus of claim 22 wherein said means for calculating comprises a finite difference, numerical grid simulator.

24. The apparatus of claim 23 wherein said means for flowing said remediating fluid comprises a pump attached to said conduit.

25. The apparatus of claim 24 wherein said means for calculating also comprises an electronic data processing system.

26. In a process of remediating a portion of an underground aquifer by flowing a remediating fluid into said aquifer at a nominal fluid flowrate, the improvement comprising the steps of:

significantly reducing said nominal flowrate over a first quiescent period after a first operating time period which lasts no more than 720 hours, wherein said first quiescent period lasts at least 0.5 hours and said first operating time and said first quiescent period form the first of a pulsing series; and pulsing said flowrate at least three times.

27. The process of claim 26 wherein the remediating fluid comprises ambient air.

* * * * *

UNITED STATES PATENT AND TRADEMARK OFFICE
CERTIFICATE OF CORRECTION

PATENT NO. : 5,445,474
DATED : August 29, 1995
INVENTOR(S) : Lundegard et al.

It is certified that error appears in the above-indentified patent and that said Letters Patent is hereby corrected as shown below:

Column 15, claim 14, line 59, after "period is at" delete "east" and insert in place thereof -- least --.

Signed and Sealed this

Nineteenth Day of December, 1995

Attest:

BRUCE LEHMAN

Attesting Officer

Commissioner of Patents and Trademarks